United States Patent [19]

Umeki et al.

[11] 4,069,367

[45] Jan. 17, 1978

[54] MAGNETIC POWDER MATERIAL COMPRISING IRON OXIDE PARTICLES WITH A COPPER-COBALT ALLOY COATING

[75] Inventors: Shinji Umeki, Saku; Kazuhide Aue, Chiba; Yasumichi Tokuoka, Saku, all of Japan

[73] Assignee: TDK Electronics Company, Limited, Tokyo, Japan

[21] Appl. No.: 323,293

[22] Filed: Jan. 12, 1973

[30] Foreign Application Priority Data

Jan. 13, 1972 Japan .................................. 47-6040

[51] Int. Cl.$^2$ ...................... H01F 1/02; C04B 35/00; C22B 1/04
[52] U.S. Cl. ..................... 428/403; 75/.5 AA; 148/31.5; 148/31.55; 427/132; 428/900; 428/928; 252/62.56
[58] Field of Search ................. 148/31.55, 105, 31.57, 148/31.5; 252/62.55, 62.56; 117/227, 235; 75/.5 AA, .5 BA; 340/174 NA; 427/127, 128, 132; 428/402, 403, 928, 900

[56] References Cited

U.S. PATENT DOCUMENTS

| | | | |
|---|---|---|---|
| 3,116,255 | 12/1963 | Meiklejohn | 252/62.55 |
| 3,516,935 | 6/1970 | Montforte et al. | 252/62.56 |
| 3,574,683 | 4/1971 | Johnston | 117/235 |
| 3,661,556 | 5/1972 | Jolley et al. | 75/.5 AA |
| 3,702,270 | 11/1972 | Kawasaki et al. | 148/105 |
| 3,720,618 | 3/1973 | Toda et al. | 252/62.56 |
| 3,748,270 | 7/1973 | Hwang | 252/62.56 |
| 3,755,796 | 8/1973 | Griest | 148/31.55 |

*Primary Examiner*—Walter R. Satterfield
*Attorney, Agent, or Firm*—Staas & Halsey

[57] ABSTRACT

A powder magnetic material for use as a magnetic recording medium and a method of its manufacture are disclosed. More particularly, the disclosed powder magnetic material is adapted to provide a magnetic recording medium of low electric resistance. In particular, an alloy of cobalt and at least one element selected from the group consisting of vanadium, molybdenum, copper, manganese, nickel, zinc and iron is deposited onto the surface of particles of magnetic iron oxides such as $Fe_3O_4$ or $\gamma Fe_2O_3$ to provide a powdered magnetic material of high coercivity, high magnetic flux density and low electric resistance.

6 Claims, No Drawings

MAGNETIC POWDER MATERIAL COMPRISING IRON OXIDE PARTICLES WITH A COPPER-COBALT ALLOY COATING

BACKGROUND OF THE INVENTION

1. Field of the Invention

This invention relates to a powdered magnetic material for use as a magnetic recording medium, and more particularly, to a powder magnetic material adapted to obtain a magnetic recording medium of low electrical resistance.

2. Description of the Prior Art

It is known to use a material such as $\gamma\text{-}Fe_2O_3$ as a magnetic material. However, $\gamma\text{-}Fe_2O_3$ satisfy the desired requirement for the characteristics of recording medium, where a high coercivity and high magnetic flux density are required.

Moreover, besides high coercivity and high magnetic density, low electrical resistance is required for magnetic powder material.

For instance, electrostatic charges are induced on the surface of a magnetic tape by friction when the tape is running, so that it cannot run smoothly and dust is attracted to the magnetic tape with the result that dropout is induced and the S/N ratio is decreased due to accidental noise.

It is known that above-mentioned production of electrostatic charges can be decreased by using a low resistance magnetic tape.

Thus, in the conventional magnetic tape, a surface active agent or carbon is added to the magnetic paint. The dispersibility of magnetic paint, however, is deteriorated by such additions or the output power of the magnetic recording is decreased in the case of addition of carbon.

SUMMARY OF THE INVENTION

An object of this invention is to provide a low electrical resistance powder magnetic material.

Another object of this invention is to provide a low electrical resistance magnetic recording medium.

A further object of this invention is to provide a new and improved method of producing such a material or medium.

In accordance with the teachings of this invention, there is provided an alloy of cobalt and at least one element selected from the group consisting of vanadium, molybdenum, copper, manganese, nickel, zinc and iron to be deposited onto the surface of particles of magnetic iron oxides. The resulting magnetic material is characterized by high coercivity, high magnetic flux density and low electrical resistance.

This invention will be more fully understood by following descriptions.

PREFERRED EMBODIMENTS OF THE INVENTION

Now, there will be described various examples of the methods of producing the magnetic material of this invention:

EXAMPLE 1

About 25 grams of spiculate or needle-shaped magnetite whose major axis is about $0.5\mu$ and its axis ratio is 6 to 8, are dispersed into a solution so as to be reacted at 100° C for an hour, the composition of the solution being as follows:

| Composition of Solution | |
| --- | --- |
| $CoCl_2 \cdot 6H_2O$ | 6 g |
| $Na_2C_4H_4O_6 \cdot 2H_2O$ | 50 g |
| $H_3BO_4$ | 20 g |
| $NaHPO_2 \cdot H_2O$ | 24 g |
| $H_2O$ | 500 ml |
| $CuCl_2 \cdot 2H_2O$ | 2 g |

The pH value of the solution is adjusted to $9.0\pm0.1$ in 5N-NaOH solution. After the product is washed with water and dried, the substance is heat-treated in a nitrogen atmosphere at 300° C for an hour. The magnetic properties and electrical resistance of the product obtained were measured.

Table 1 below shows the measured values of various materials, wherein No. 1 denotes pure magnetite before treatment in accordance with the teachings of this invention, No. 2 denotes magnetite containing cobalt only, and No. 3 denotes magnetite containing deposited alloy of cobalt and copper in accordance with this invention.

Table 1

| | | material | No. 1 | No. 2 | No. 3 |
| --- | --- | --- | --- | --- | --- |
| coercive force | Hc | (Oe) | 390 | 544 | 520 |
| residual magnetic flux density | Br/ρ | (G Cm³/g) | 485 | 525 | 514 |
| saturated magnetic flux density | Bm/ρ | (G CM³/g) | 970 | 1072 | 1040 |
| rectangular ratio | Br/Bm | | 0.50 | 0.49 | 0.49 |
| electrical resistance | R | (Ω) | $1\times10^8$ | $1\times10^{10}$ | $1\times10^6$ |
| amount of deposited metals | Co | | 0 | 5.0 | 3.0 |
| | Cu | (Wt %) | 0 | 0 | 0.4 |

As shown in the table 1, the electric resistance of material No. 3 of this invention is lower than that of materials No. 1 and 2 because of addition of copper, and its coercive force and magnetic flux density are much improved by said addition.

Though the amount of deposited metals is shown individually as Co or Cu in the table 1, it denotes chemically analyzed results and Co and Cu were deposited actually in the form of alloy. Such expression is used in the same manner in the other examples.

The measurement of electrical resistance is carried out by the following method:

Powder magnetic material was packed into a glass tube whose diameter and length are 4mm and 60mm, respectively, and the density of the packed powder is 0.7 g/cm³. Mercury electrodes are attached to the both ends of the glass tube, and the measurement is carried out by an electrometer.

Magnetic characteristics are measured by a self-recording flux meter under the condition that H max was 5000 Oe.

These measuring methods are used in other examples in the same manner.

EXAMPLE 2

In this example, manganese is utilized in stead of copper in example 1, and the magnetic properties and electrical resistance of the resultant powder magnetic material (No. 4) produced by the same method as the method of the example 1, are shown in table 2 below.

Table 2

|  |  |  | material No. 4 |
|---|---|---|---|
| coercive force | Hc | (Oe) | 608 |
| residual magnetic flux density | Br/ρ | (G . Cm³/g) | 543 |
| saturated magnetic flux density | Bm/ρ | (G . Cm³/g) | 1083 |
| rectangular ratio | Br/Bm |  | 0.50 |
| electrical resistance | R | (Ω) | 1×10⁷ |
| amount of deposited metals | Co |  | 1.5 |
|  | Mn | (wt %) | 0.3 |

As shown in table 2, the electrical resistance is decreased by the addition of manganese, in comparison with the characteristics of the materials No. 1 and No. 2 as shown in table 1; and high coercive force and high magnetic flux density of material No. 4 are obtained.

Thus, the effect of manganese is substantially the same as that of copper.

EXAMPLE 3

About 50 grams of spiculate magnetite, whose major axis is about $0.5\mu$ and whose axis ratio is 6 to 8, is dispersed into a solution to be reacted at 70° C for an hour, the composition of the solution being as follows:

Composition of solution

| | |
|---|---|
| $CoCl_2 \cdot 6H_2O$ | 5 g |
| Rochell salt | 13 g |
| hydrazine hydrate | 25 g |
| $H_2O$ | 500 ml |
| $ZnCl_2$ | 2 g |

In this example, zinc is used in stead of copper (Example 1) or manganese (example 2). The pH value of the solution is adjusted to be about 12.0 in 5N—NaOH.

Table 3 shows the measured values of magnetic characteristics and electrical resistance of the obtained powder magnetic material.

Table 3

|  |  |  | material No. 5 | No. 6 |
|---|---|---|---|---|
| coercive force | Hc | (Oe) | 560 | 450 |
| residual magnetic flux density | Br/ρ | (G . Cm³/g) | 453 | 430 |
| saturated magnetic flux density | Bm/ρ | (G . Cm³/g) | 914 | 900 |
| rectangular ratio | Br/Bm |  | 0.50 | 0.48 |
| electrical resistance | R | (Ω) | 1×10⁷ | 1×10⁹ |
| amount of deposited metals | Co |  | 4.0 | 1.0 |
|  | Zn | (wt %) | 3.0 | 4.0 |

As shown in table 3, the electrical resistance of the materials Nos. 5 and 6 is smaller than that of materials Nos. 1 and 2. The decrease of electrical resistance resulted from the addition of zinc. The electrical resistance of the material No. 6, however, shows a rather high value, $1 \times 10^9$, and hence zinc should not be added more than 3wt%.

EXAMPLE 4

23 grams of spiculate magnetite, whose major axis is about $0.5\mu$ and whose axis ratio is 6 to 8, are dispersed into a solution, the compositions of the solutions being shown in the table 4, and the pH value of the solution being adjusted to 12.5 in 5—NaOH solution. The total volume of the mixture of magnetite and the solution is about 500ml and the mixture is reacted at 100° C for 2 hours.

Table 4

|  |  | material No. 7 | No. 8 | No. 9 | No. 10 |
|---|---|---|---|---|---|
| 0.1 mol $CoCl_2$ solution | (ml) | 30 | 60 | 90 | 120 |
| Rochelle salt | (g) | 2.0 | 4.0 | 6.0 | 8.0 |
| 1% hydro-boron sodium | (ml) | 3 | 6 | 9 | 12 |
| $NH_4VO_3$ | (g) | 0.35 | 0.35 | 0.35 | 0.25 |
| $(NH_4)_6Mo_7O_2 \cdot 4H_2O$ | (g) | 2.5 | 2.5 | 2.5 | 2.5 |
| $Fe_3O_4$ | (g) | 23 | 23 | 23 | 23 |

The product obtained is filtered, washed and dried, and then heat-treated at 400° C for an hour in nitrogen atmosphere so that powder magnetic material is obtained, the magnetic properties and electric resistance of the product being shown in table 5.

Table 5

|  |  |  | material No. 7 | No. 8 | No. 9 | No. 10 |
|---|---|---|---|---|---|---|
| coercive force | Hc | (Oe) | 520 | 612 | 704 | 564 |
| residual magnetic flux density | Br/ρ | (GCm³/g) | 515 | 519 | 517 | 563 |
| saturated magnetic flux density | Bm/ρ | (GCm³/g) | 1080 | 1077 | 1061 | 1074 |
| rectangular ratio | Br/Bm |  | 0.48 | 0.48 | 0.49 | 0.52 |
| electrical resistance |  | (Ω) | 7.2×10⁵ | 3.4×10⁵ | 1.3×10⁵ | 4.2×10⁵ |
| amount of deposited metals | V |  | 0.10 | 0.25 | 0.44 | 0.20 |
|  | Mo | (wt%) | 0.05 | 0.11 | 0.07 | 0.20 |
|  | Co |  | 0.65 | 1.06 | 1.51 | 2.15 |

As shown in the table 5, the addition of vanadium and molybdenum is effective to decrease electrical resistance.

Though vanadium and molybdenum are added together in this example, a signal addition of vanadium and molybdenum is also effective.

EXAMPLE 5

25 grams of spiculate magnetite, whose axis is about $0.5\mu$ and whose axis ratio is 6 to 8, is dispersed into a solution and heated at 100° C for an hour to be reacted. The compositions of the various solutions are shown in table 6.

Table 6

|  |  | material No. 11 | No. 12 | No. 13 |
|---|---|---|---|---|
| $CoSO_4 \cdot 7H_2O$ | (g) | 4.5 | 4.5 | 4.5 |
| $NaHPO_2 \cdot H_2O$ | (g) | 13.5 | 13.5 | 13.5 |
| $Na_2C_4H_4O_6 \cdot 2H_2O$ | (g) | 57.5 | 57.5 | 57.5 |
| $H_3BO_4$ | (g) | 16.0 | 16.0 | 16.0 |
| $H_2O$ | (ml) | 500 | 500 | 500 |
| $NH_4VO_3$ | (g) | 0.5 | 1.0 | 2.0 |
| $\gamma$-$Fe_2O_3$ | (g) | 25 | 25 | 25 |

The pH value of the solution is adjusted to 9.0±0.1 in 5N—NaOH solution.

The product obtained is filtered, washed and dried, and then heat-treated at 350° C in nitrogen atmosphere for an hour. The magnetic properties and electric resistance of the thus-obtained powder magnetic materials are measured and the results are shown in table 7.

Table 7

| | | material | No. 11 | No. 12 | No. 13 | No. 14 |
|---|---|---|---|---|---|---|
| coercive force | Hc | (Oe) | 416 | 544 | 576 | 512 |
| residual magnetic flux density | Br/ρ | (G . Cm³/g) | 476 | 540 | 558 | 519 |
| saturated magnetic flux density | Bm/ρ | (G . Cm³/g) | 939 | 905 | 910 | 909 |
| rectangular ratio | Br/Bm | | | 0.507 | 0.597 | 0.613 0.571 |
| electrical resistance | R | (Ω) | | | | |
| amount of deposited metals | Co | | 0 | 1.56 | 1.56 | 1.50 |
| | V | (wt %) | 0 | 1.02 | 1.02 | 1.20 |

As shown in the table 7, the electrical resistance of the material Nos. 12 to 14 which contains vanadium is much smaller than that of the material No. 11 which is composed of γ-Fe₂O₃ only. Thus, a reduced electrical resistance is obtained by the addition of vanadium.

EXAMPLE 6

The magnetic properties and electrical resistance of powder magnetic material produced by the same method as the method described in the example 5 with the exception of using iron instead of vanadium are shown in table 8.

Table 8

| | | material | No. 15 | No. 16 | No. 17 |
|---|---|---|---|---|---|
| coercive force | Hc | (Oe) | 544 | 530 | 524 |
| residual magnetic flux density | Br/ρ | (G . Cm³/g) | 521 | 511 | 501 |
| saturated magnetic flux density | Bm/ρ | (G . Cm³/g) | 975 | 975 | 976 |
| rectangular ratio | Br/Bm | | 0.534 | 0.524 | 0.503 |
| electrical resistance | R | (Ω) | 9×10⁸ | 6×10⁸ | 1×10⁸ |
| amount of deposited metals | Co | (wt%) | 2.71 | 1.74 | 1.33 |
| | Fe | | 0.4 | 0.8 | 1.1 |

As shown in the table 8, the effect of the addition of iron is substantially the same as that of vanadium (example 5), the electric resistance being decreased in comparison with the material No. 11.

Thus, the electrical resistance of the material of this invention is $10^5 \sim 10^8 \Omega$ while that of the original material Fe₃O₄ or Fe₂O₃ is $10^8 \Omega$ or $10^{10} \Omega$, respectively.

The amount of added elements is limited to 3% by weight or less. The reason of this restriction is as follows:

The electrical resistance of the material containing 3wt% of zinc is low, e.i. $1 \times 10^7 \Omega$, as shown in the example 4, while if 4wt% of zinc is added a relatively high value of $1 \times 10^9 \Omega$ is realized. In the latter case, the coercive force and magnetic flux density are also decreased. Therefore, the addition of zinc has an upper limit. The deposition of cobalt is remarkably decreased as the deposition of other elements is increased, which results in the decrease of Hc and Br.

Therefore, if it is desired that the electrical resistance be kept very low, the coercive force be higher than 500 Oe and the residual magnetic flux density be higher than 450 G.cm³/g, then the amount of added substances has to be confined to less than 3% by weight.

Thus, powder magnetic material which has low electrical resistance, high coercivity and high remanence can be obtained according to this invention. It will be easily understood that the electrical resistance of the magnetic medium made of such low electric resistance powder magnetic material is also low.

Magnetic tapes were manufactured from the materials of the examples 1 and 2 (materials Nos. 2 and 4). In particular, a powder magnetic material produced by the examples 1 and 2, dispersing agents and lacquer were mixed by a dispersing machine to provide a magnetic point.

This magnetic paint was applied to 3μ thick polyester film by an applicator whose gap width was 2 mil so as to form a magnetic film on the polyester film. After drying, the film was cut off into test pieces whose width and length were 50mm and 100mm, respectively. The electric resistance of these test pieces was measured by an electrometer along its length. The results obtained are shown in table 9.

Table 9

| | electrical resistance (Ω) |
|---|---|
| Fe₃O₄ | 3.4 × 10⁸ |
| γ-Fe₂O₃ | 1 × 10¹⁰ |
| Fe₃O₄ containing Co and Cu | 2 × 10⁷ |
| Fe₃O₄ containing Co and Mo | 7 × 10⁷ |
| Fe₃O₄ containing Co | 7 × 10⁹ |

As shown in table 9, a magnetic tape having a low electric resistance is obtained and it is understood that the advantageous aspects of this invention are maintained effective as well as the powder magnetic material. Though above example is shown in the form of the magnetic tape, similar results may be obtained with a magnetic disk or sheet etc.

Chlorides were used as metallic salts in the examples, but sulfates, nitrates or salts of organic acid can be used alternatively in the same manner. Proper reducing agents other than that used in the examples can be also used.

The electrical resistance of the powder magnetic material is greatly reduced by this invention, and in contrast to conventional methods, carbon is not added upon production of the magnetic tape and hence the amount of magnetic powder contained in the tape can be increased so that the magnetic properties are improved.

Numerous changes may be made in the above described embodiments of the invention without departing from the spirit thereof; therefore, it is intended that all matter contained in the foregoing description shall be interpreted as illustrative and not in a limiting sense.

What we claimed is:

1. A magnetic powder material comprising magnetic iron oxide particles having a substantially uniform coating of an alloy consisting essentially of Co and Cu, said alloy being deposited on said iron oxide particles in an amount sufficient to provide high coercivity, high magnetic flux density and low electrical resistance, the amount of Co in said alloy being about 3 wt% with respect to the weight of said iron oxide particles and said amount of Cu in said alloy being about 0.4 wt% with respect to the weight of said iron oxide particles.

2. A magnetic powder material comprising magnetic iron oxide particles having a substantially uniform coating of an alloy consisting essentially of Co and Mn, said alloy being deposited on said iron oxide particles in an amount sufficient to provide high coercivity, high magnetic flux density and low electrical resistance, the amount of Co in said alloy being about 1.5 wt% with respect to the weight of said iron oxide particles and said amount of Mn in said alloy being about 0.3 wt% with respect to the weight of said iron oxide particles.

3. A magnetic powder material comprising magnetic iron oxide particles having a substantially uniform coating of an alloy consisting essentially of Co and Zn, said alloy being deposited on said iron oxide particles in an amount sufficient to provide high coercivity, high magnetic flux density and low electrical resistance, the amount of Co in said alloy being about 4 wt% with respect to the weight of said iron oxide particles and said amount of Zn in said alloy being about 3 wt% with respect to the weight of said iron oxide particles.

4. A magnetic powder material comprising magnetic iron oxide particles having a substantially uniform coating of an alloy consisting essentially of Co, V and Mo, said alloy being deposited on said iron oxide particles in an amount sufficient to provide high coercivity, high magnetic flux density and low electrical resistance, the amount of Co in said alloy being in the range of about 0.65-2.15 wt% with respect to the weight of said iron oxide particles, said amount of V in said alloy being in the range of about 0.10-0.44 wt% and said amount of Mo in said alloy being in the range of about 0.05-0.2 wt% with respect to the weight of said iron oxide particles.

5. A magnetic powder material comprising magnetic iron oxide particles having a substantially uniform coating of an alloy consisting essentially of Co and V, said alloy being deposited on said iron oxide particles in an amount sufficient to provide high coercivity, high magnetic flux density and low electrical resistance, the amount of Co in said alloy being about 1.5 wt% with respect to the weight of said iron oxide particles and said amount of V in said alloy being about 1.20 wt% with respect to the weight of said iron oxide particles.

6. A magnetic powder material consisting essentially of magnetic iron oxide particles having a substantially uniform coating of an alloy consisting essentially of Co and Fe, said alloy being deposited on said iron oxide particles in an amount sufficient to provide high coercivity, high magnetic flux density and low electrical resistance, the amount of Co in said alloy being in the range of about 1.33-2.71% with respect to the weight of said iron oxide particles and said amount of Fe in said alloy being about 0.4-1.1 wt% with respect to the weight of said iron oxide particles.

* * * * *

UNITED STATES PATENT AND TRADEMARK OFFICE
CERTIFICATE OF CORRECTION

PATENT NO. : 4,069,367
DATED : January 17, 1978
INVENTOR(S) : Shinji Umeki et al It is certified that error appears in the above-identified patent and that said Letters Patent are hereby corrected as shown below:

In the Abstract, line 10, "$\gamma Fe_2O_3$" should be -- $\gamma\text{-}Fe_2O_3$ --;

Column 2, lines 3, 4, 6 and 8, all "." should be -- · -- (raised);

Column 2, line 30 "(G $CM^3$/g)" should be -- (G $Cm^3$/g) --;

Column 2, line 64, "in stead" should be -- instead --;

Column 3, Table 2, "(G.$Cm^3$/g)" should be -- (G·$Cm^3$/g) -- in both occurrences);

Column 3, line 43, "$CoCl_2$ . $6H_2O$" should be -- $CoCl_2$ · $6H_2O$ --;

Column 3, line 48, "in stead" should be -- instead --;

Column 3, Table 3, "(G.$Cm^3$/g)" should be -- (G·$Cm^3$/g) -- both occurrences;

Column 4, line 9, "5-NaoH" should be -- 5 - NaOH --;

Column 4, Table 4, "$(NH_4)_6Mo_7O_2.4H_2O$" should be -- $(NH_4)_6Mo_7O_{24}$ · $4H_2O$ --;

Column 4, Table 4, under "No. 10", "0.25" should be -- 0.35 --;

Column 4, Table 6, lines 55-57, all "." should be -- · -- (raised);

Column 5, Table 7, "(G.$Cm^3$/g)" should be -- (G·$Cm^3$/g) -- and "(Wt %)O" should be -- (Wt %) --;

Column 5, Table 7, under "No. 11", "1.02" should be -- 0 --;

UNITED STATES PATENT AND TRADEMARK OFFICE
CERTIFICATE OF CORRECTION

PATENT NO. : 4,069,367
DATED : January 17, 1978
INVENTOR(S) : Shinji Umeki et al It is certified that error appears in the above-identified patent and that said Letters Patent are hereby corrected as shown below:

Column 5, Table 7, under "No. 13", "1.20" should be -- 1.02 --;
Column 5, Table 7, under "No. 14", below "1.50" please insert -- 1.20 --;
Column 5, Table 8, "(G.Cm$^3$/g)" should be -- (G·Cm$^3$/g) --;
Column 5, line 48, "e.i." should be -- i.e. --;
Column 5, line 59, "G.cm$^3$/g" should be -- G·cm$^3$/g --;
Column 6, line 16, "paint" should be -- point --;
Column 6, line 33, "electric" should be -- electrical --;
Column 6, Table 9, "3.4" should be -- 3.5 --;
Column 8, line 14, "1.20" should be -- 1.02.

Signed and Sealed this

Twentieth Day of June 1978

[SEAL]

Attest:

RUTH C. MASON
Attesting Officer

DONALD W. BANNER
Commissioner of Patents and Trademarks